No. 607,138. Patented July 12, 1898.
A. W. SEVERANCE.
SELF FEEDER FOR THRESHING MACHINES.
(Application filed Nov. 26, 1897.)
(No Model.) 3 Sheets—Sheet 1.
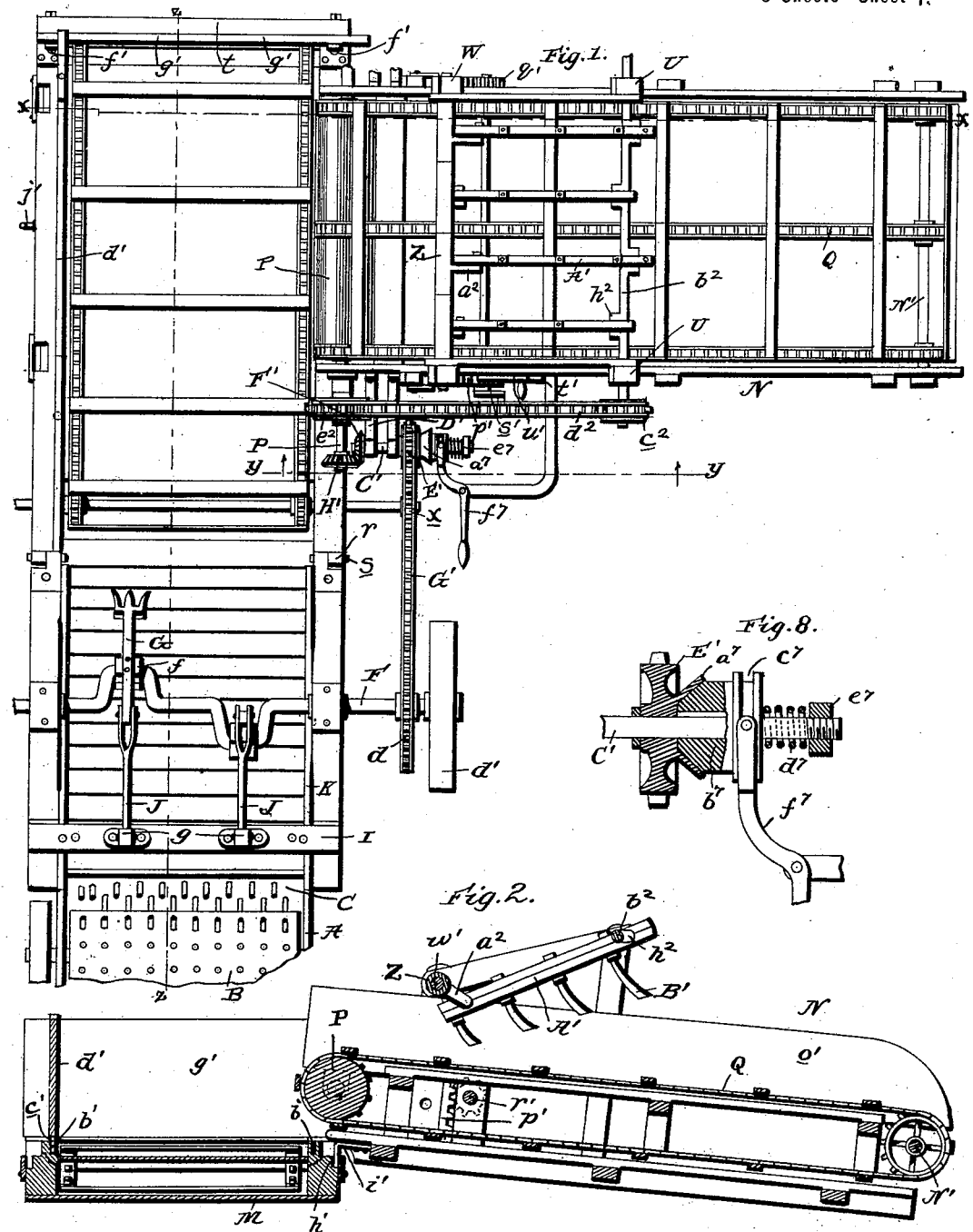
Witnesses:
C. H. Reeder
Jessie G. Croney
Inventor
A. W. Severance
By James Sheehy
Attorney No. 607,138. Patented July 12, 1898.
A. W. SEVERANCE.
SELF FEEDER FOR THRESHING MACHINES.
(Application filed Nov. 26, 1897.)
(No Model.) 3 Sheets—Sheet 2.
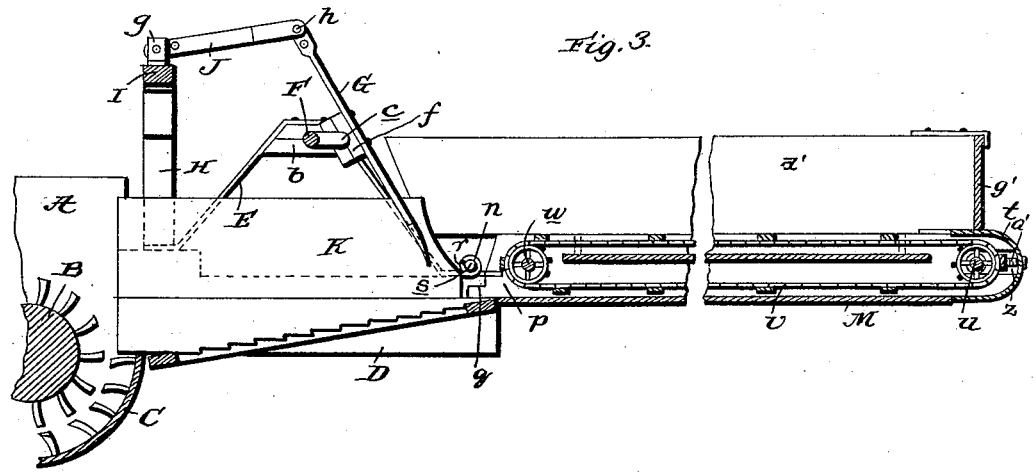
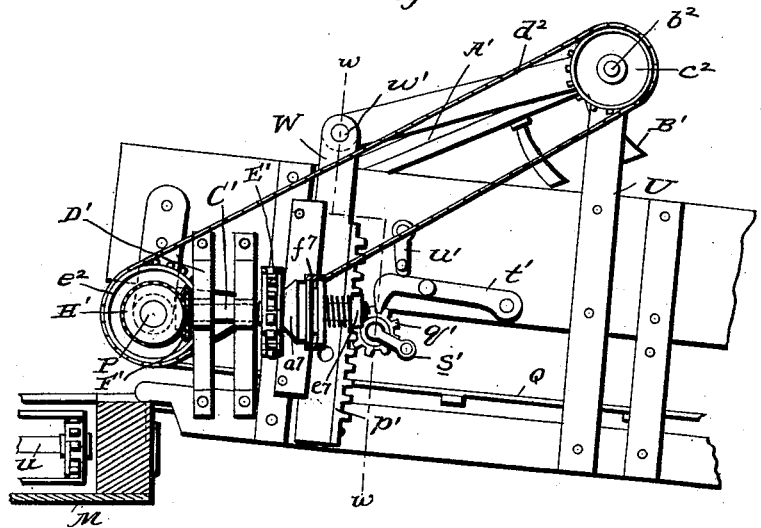
Witnesses:
Inventor
A. W. Severance
By James J. Shuly
Attorney No. 607,138. Patented July 12, 1898.
A. W. SEVERANCE.
SELF FEEDER FOR THRESHING MACHINES.
(Application filed Nov. 26, 1897.)
(No Model.) 3 Sheets—Sheet 3.

Witnesses:
C. H. Raeder
Jessie G. Croney

Inventor
A. W. Severance
By James J. Sheehy
Attorney

UNITED STATES PATENT OFFICE.

ADAM W. SEVERANCE, OF WALLA WALLA, WASHINGTON.

SELF-FEEDER FOR THRESHING-MACHINES.

SPECIFICATION forming part of Letters Patent No. 607,138, dated July 12, 1898.

Application filed November 26, 1897. Serial No. 659,855. (No model.)

*To all whom it may concern:*

Be it known that I, ADAM W. SEVERANCE, a citizen of the United States, residing at Walla Walla, in the county of Walla Walla and State of Washington, have invented certain new and useful Improvements in Self-Feeders for Threshing-Machines; and I do declare the following to be a full, clear, and exact description of the invention, such as will enable others skilled in the art to which it appertains to make and use the same.

My invention relates to self-feeders for threshing-machines, and it is designed more particularly as an improvement on the self-feeder disclosed in Letters Patent No. 530,246, of December 4, 1894, granted to Severance, Jamison, and Braucht.

The novelty and advantages of my present invention will be fully understood from the following description and claim when taken in conjunction with the annexed drawings, in which—

Figure 5:
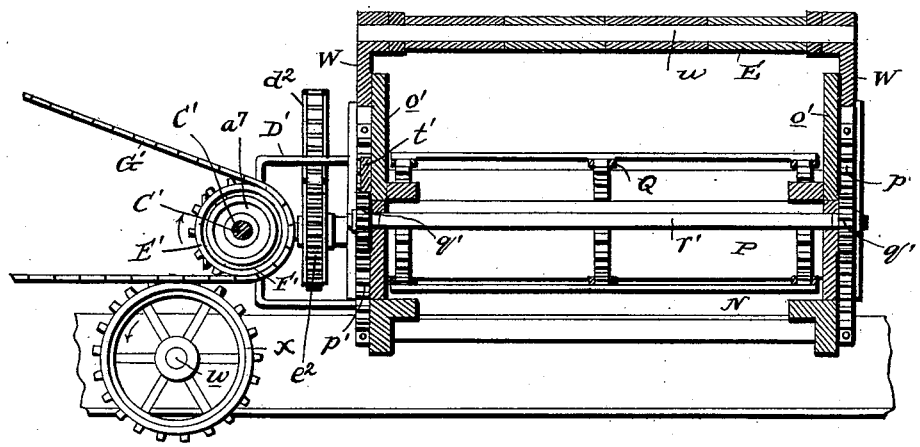
Figure 6:
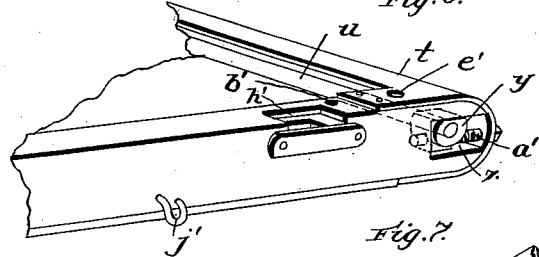
Figure 7:
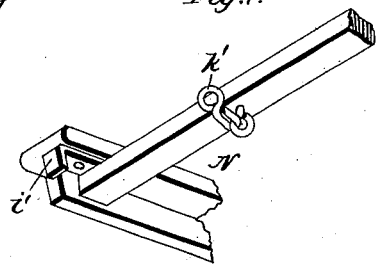

Figure 1 is a plan view of my improved self-feeder complete, the same being shown in its proper relation to the receiving end of a threshing-machine. Fig. 2 is a section taken in the plane indicated by the line $x$ $x$ of Fig. 1. Fig. 3 is a section taken in the plane indicated by the line $z$ $z$ of Fig. 1. Fig. 4 is an enlarged detail section taken in the plane indicated by the line $y$ $y$ of Fig. 1. Fig. 5 is a section taken in the plane indicated by the line $w$ $w$ of Fig. 4. Fig. 6 is a detail enlarged perspective view of a portion of the apron. Fig. 7 is a detail perspective view of one end of the lateral feed-trough, and Fig. 8 is a detail view illustrating the friction-clutch.

In the said drawings similar letters designate corresponding parts in all of the several views, referring to which—

A indicates the cylinder-casing, B a part of a cylinder, and C the concave, of an ordinary threshing-machine, such parts being here shown simply for the purpose of illustrating my improvements in connection therewith.

D indicates a horizontal frame. This frame is provided on opposite sides with angular metallic bars E, which have secured to them boxes $b$, which are designed to receive a horizontal shaft F. This shaft is provided with cranks $c$, and on one end of it is fixed a sprocket-wheel $d$ and a band-pulley $d'$, the latter being designed to be connected by a belt (not shown) with any suitable driving part of the threshing-machine.

G indicates forks. These forks carry at a suitable point in their length boxes $f$, in which the cranks of the shaft F are journaled, so that said forks will be given a vertically-rotatable motion during the rotary motion of the crank-shaft.

Rising from opposite sides of the frame D are uprights H, which are secured to said frame and are connected at their upper ends by a cross-bar I. On this cross-bar are arranged lug-journals $g$, and in these lugs are pivoted one end of arms J, the opposite ends of which are pivotally connected to the upper ends of the forks, as shown at $h$. The frame D is provided with side-boards K, which may be of suitable height. The angular irons or braces E are extended at their rear ends beyond the frame D, as shown, and are formed with bearings $n$ for a purpose presently described.

M indicates an apron-frame which has the forward ends of its side bars $p$ rabbeted, as indicated by $q$, (see Fig. 3,) to interlock with the correspondingly-rabbeted rear ends of the boards K of the frame D, so as to hold the apron-frame, which bears at its forward end on the frame D, in a horizontal position, as illustrated. The said apron-frame is provided at the forward ends of its side bars $p$ with lug-eyes $r$, which are designed to register with the eyes $n$ of the irons E on the frame D and be pivotally connected therewith by pintles $s$, as shown. This mode of connection permits of the apron-frame being swung up against the rear of the frame D, the rear ends of the side boards K of said frame being cut away, as shown, so as to permit of the apron-frame M when not in use being swung forward of the perpendicular, so as to enable it to rest against the frame D without tendency of falling.

The apron-frame M comprises the side bars $p$ and rear end bar $t$, the latter being preferably of metal in the shape shown, so as to enable it to serve as a housing for the rear roller $u$ of the endless feed-apron $v$, which takes around said roller and also around a forward roller $w$, as shown. The roller $w$ is journaled in the side bars $p$ and has one end extended and provided with a sprocket-wheel $x$ for a purpose presently described. The rear roller $v$, however, is journaled in blocks $y$, and these blocks, which are arranged in slots $z$ in the bars $p$, have threaded apertures to receive screws $a'$, (see Fig. 7,) which are journaled in the end bar $t$ of the apron-frame and are designed to tighten the feed-apron whenever necessary.

The apron-frame M is provided in each of its side bars $p$ with the two sockets $b'$ to receive studs $c'$ of the removable side guard $d'$, and it is also provided in said side bars $p$, adjacent to the rear ends thereof, with sockets $e'$ to receive the depending studs $f'$ of the removable end guard $g'$. The side and end guards $d'$ $g'$ are made removable, so that when the apron is not in operation they may be removed to permit of the apron-frame M being swung snugly against the rear end of the frame D. The side guard $d'$ is also made removable, so that it may be placed on either side of the apron-frame when the lateral feed-trough (presently described) is arranged at the opposite side thereof.

The apron-frame M is provided in each of its side bars $p$ with sockets $h'$ to receive the hooks $i'$ at the inner end of the lateral feed-trough N, and it is also provided on each of its side bars with hooks $j'$ for the engagement of the connecting-chain $k'$ at the inner end of the feed-trough.

The feed-trough N has the side boards $o'$, the rotatable shaft N', journaled in suitable bearings, and the cylinder P, journaled transversely in the opposite end to receive the endless feed-belt Q.

U indicates two uprights which are connected to and rise from the side boards of the feed-trough N, and W indicates two uprights arranged one on each side of the trough N and in advance of the uprights U. Fixed on the uprights W are rack-bars $p'$, with which engage pinions $q'$, fixed on a transverse shaft $r'$, journaled in the feed-trough and extending across the same. This shaft $r'$ has a crank $s'$ at one end, through the medium of which it may be rotated, and when it is rotated in one direction it will be seen that the uprights W will be raised, while when it is rotated in the opposite direction said uprights will be lowered. In order to lock the uprights W in their adjusted positions, the pawl $t'$ is provided, which is normally held in engagement with one of the pinions $q'$ by a swinging piece $u'$, as better shown in Fig. 4.

Journaled in the upper ends of the uprights W is a transverse rod $w'$, and on this rod are loosely arranged sleeves Z, which have integral depending branches $a^2$.

Journaled in the fixed uprights U is a crank-shaft $b^2$, and on one end of this crank-shaft is a band wheel or pulley $c^2$, which is designed to be connected by means of a band $d^2$ with a band wheel or pulley $e^2$ on one end of the shaft P, so as to receive motion from the latter shaft and impart the same to the crank-shaft $b^2$.

A' indicates reciprocatory bars. These bars may carry cutters B' to cut the bands on the bound bundles of grain, and when loose grain is used the cutters may be removed and spreader-fingers may be substituted. The bars are journaled at their forward ends in the arms $a^2$ of the sleeves Z on the rod $w'$, which is of a less altitude than the crank-shaft $b^2$, and the upper or opposite ends of said bars are journaled in the cranks $h^2$ of the shaft $b^2$. By this construction it will be seen that as motion is communicated to the shaft $b^2$ the bars A' will be given a vertical reciprocatory movement, and as the cranks of the shaft $b^2$ are disposed in opposite directions some of the bars will be moving forwardly while others are moving rearwardly, thereby more effectually cutting the bands or spreading the grain, as the case may be.

C' indicates a short shaft which is journaled in a bracket D', connected to the side of the feed-trough N.

E' indicates a sprocket-wheel which is loose on the shaft C', but is held against lateral movement thereon by suitable means, and F' indicates a beveled gear-wheel which is fixed on the shaft C'. The beveled gear-wheel F' meshes with a corresponding wheel H' on the shaft P to transmit motion to the belt of the feed-trough, as shown.

The sprocket-wheel E' on shaft C' is rotated from the pulley $d$ of shaft F through the medium of the sprocket-belt G', and said wheel E' is normally fixed on the shaft C', so as to transmit motion thereto through the medium of a suitable friction-clutch $B^7$, a type of which is illustrated in Fig. 8. As shown, the sprocket-belt G' takes over and engages the sprocket-wheel $x$ on the shaft $w$, as shown, whereby it will be seen that it will drive the feed-apron $v$ in a forward direction. The friction-clutch $B^7$ comprises a conical receiver $a^7$, fixed to the sprocket-wheel E', an adjustable cone $b^7$, which is splined on the shaft C' and has a peripheral groove $c^7$, and a coiled spring $d^7$, which is interposed between an enlargement $e^7$ on the shaft and the cone $b^7$ and is designed to normally press the said cone into and against the conical receiver $a^7$, so as to cause the shaft C' to turn with the sprocket-wheel. The cone $b^7$ is designed to be adjusted by a lever $f^7$, which is fulcrumed at an intermediate point of its length and has one of its ends seated in the groove $c^7$ of the cone, as illustrated.

In virtue of this construction it will be seen that when the lever $f^7$ is rocked in the direction indicated by arrow the cone $b^7$ will be moved out of engagement with the cone-receiver $a^7$, and in consequence the sprocket-wheel E' will be rendered loose on the shaft C', which will result in a stoppage of the apron Q of the lateral feed-trough without discontinuing the rotation of the shaft $w$ and the operation of the bars A'. Thus when a very large quantity of grain is deposited on the apron $v$ of the apron-frame M the belt Q of the feed-trough may be stopped until the said apron $v$ has properly conveyed the grain to the forks G. While the belt Q will be stopped, as stated, the movements of the bars A' will not be discontinued, and in consequence the knives B' will cut the bands of the bundles of grain on the idle apron-belt Q, or if fingers are employed in lieu of said knives they will serve to thoroughly open and separate the grain on the apron, so that when said apron or belt is again started no choking will ensue. It will be obvious from the foregoing that by adjusting the uprights W and rod $m'$ the amount of grain passing under the knives B' may be regulated.

In the practical operation of the invention the grain is thrown into the feed-trough and carried by the endless belt thereof beneath the cutters and then discharged in a loose state upon the apron $v$. This will carry it to the frame D, and as it enters the same it will be taken by the reciprocatory forks G and fed into the cylinder-casing of the threshing-machine.

When the feed-trough N is to be arranged at either side of the apron-frame M, it is obvious that the gearing at one side of the threshing-machine, apron-frame M, and feed-trough N must be duplicated at the opposite sides thereof. It is not deemed necessary, however, to illustrate such gearing.

The employment of the lateral feed-trough N is advantageous because it extends or reaches out farther from the threshing-machine than the ordinary end feed and permits of a large amount of grain being fed to the machine without the necessity of moving the same. Said lateral feed-trough also permits of the employment of a low derrick instead of the high derrick which must be of necessity employed in conjunction with the ordinary end feed-trough, and it also enables the attendants to quickly get the machine in operation when it arrives at a "setting," inasmuch as the derrick sets on one side of the machine and out of the way.

Having thus described my invention, what I claim is—

A grain-feeder for threshing-machines, comprising a frame D, a crank-shaft journaled in said frame and adapted to operate grain-feeding forks, a sprocket-wheel $d$, fixed on said shaft, an apron-frame pivotally connected to and arranged in alinement with the frame D, and having a removable side guard and a removable end guard, shafts journaled in said frame, an endless apron taking around said shafts, a sprocket-wheel $x$, fixed on the forward shaft, a lateral feed-trough detachably connected to one side of the apron-frame, shafts journaled in said feed-trough, a feed-belt taking around said shafts, a band-wheel $e^2$, fixed on the forward shaft, a beveled gear-wheel H', also fixed on the forward shaft, a short shaft journaled in a bracket connected to the feed-trough and having a gear F', engaging the gear H', and also having a loose sprocket-wheel E', a friction-clutch for detachably fixing the wheel E', on the shaft, a sprocket-belt taking around the sprocket-wheels E', $d$, and passing over and engaging the sprocket-wheel $x$, a transverse shaft journaled on the feed-trough and having cranks at intervals in its length, bars connected with and adapted to be actuated by the said cranks and also adapted to carry knives or grain-spreading fingers, a band-wheel $c^2$, fixed on the crank-shaft, and a band taking around said wheel $c^2$, and the band-wheel $e^2$, all substantially as specified.

In testimony whereof I affix my signature in presence of two witnesses.

ADAM W. SEVERANCE.

Witnesses:
A. K. DICE,
JOEL S. WISEMAN.